Aug. 23, 1932.  C. P. GALANOT  1,872,924
POWER TAKE-OFF MECHANISM
Filed Oct. 29, 1927   3 Sheets-Sheet 1
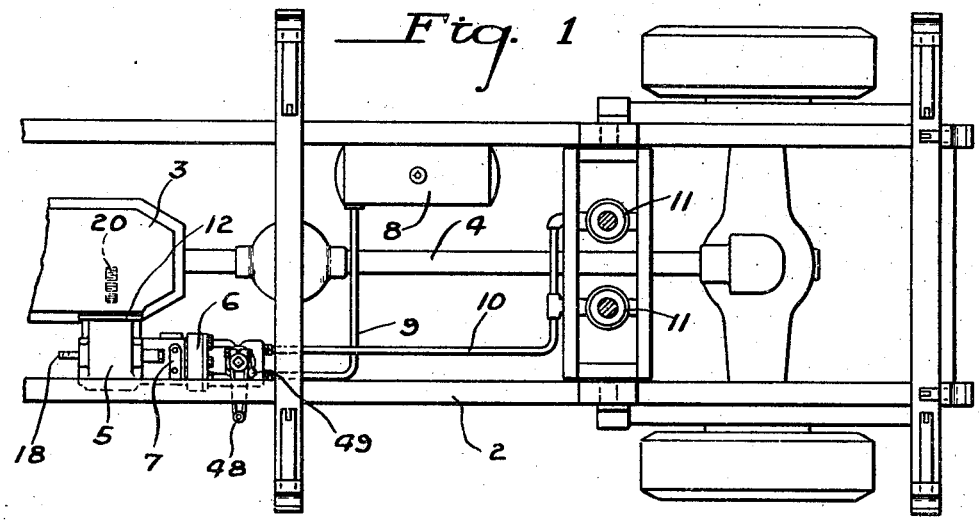
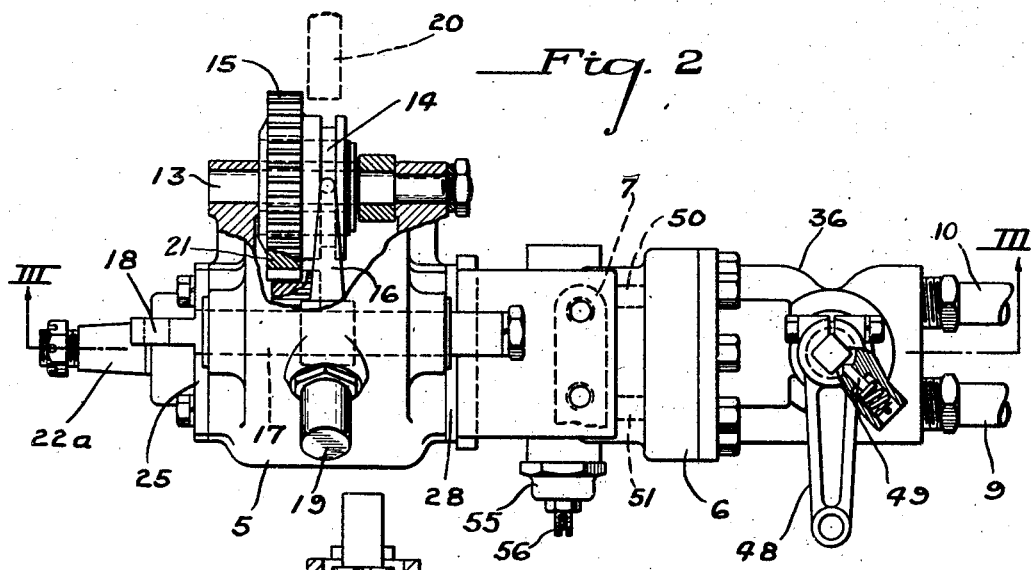
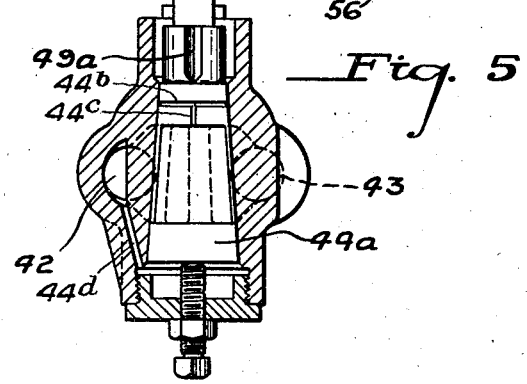
INVENTOR Aug. 23, 1932.  C. P. GALANOT  1,872,924
POWER TAKE-OFF MECHANISM
Filed Oct. 29, 1927   3 Sheets-Sheet 2
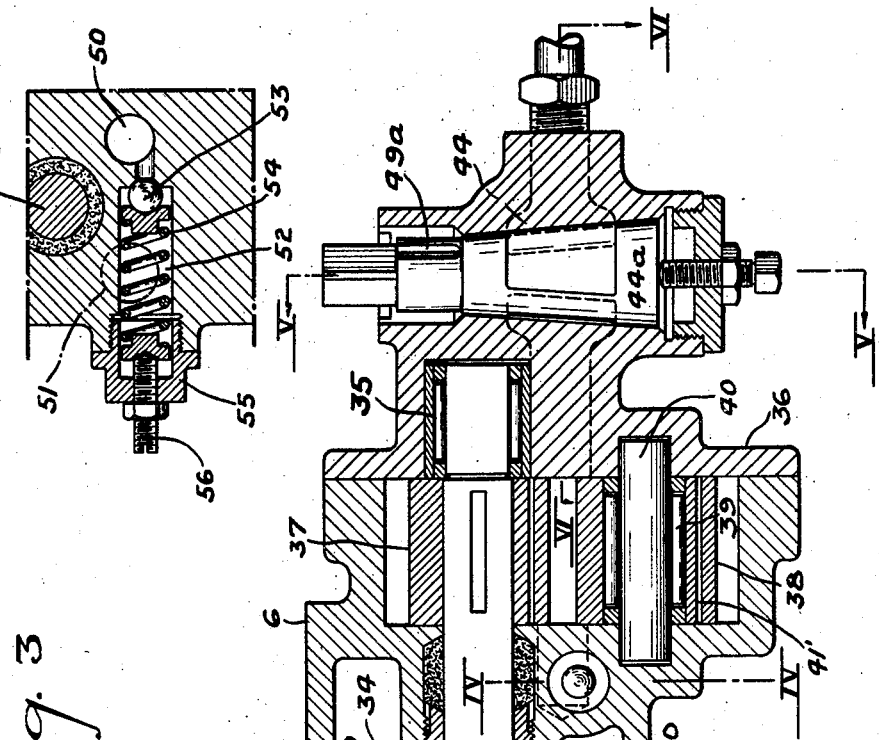
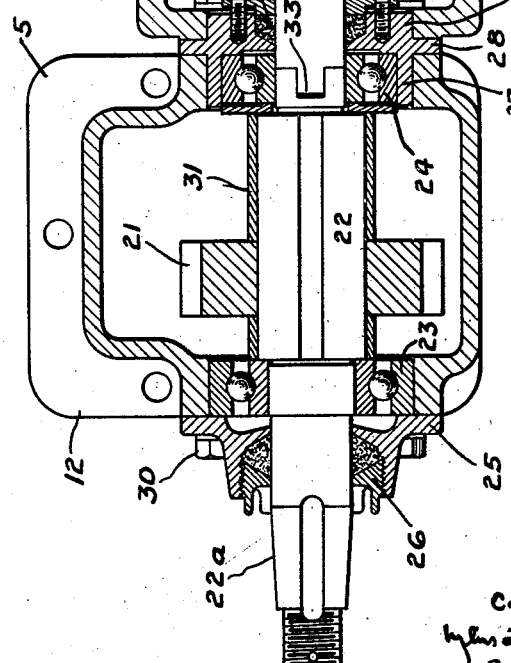
INVENTOR

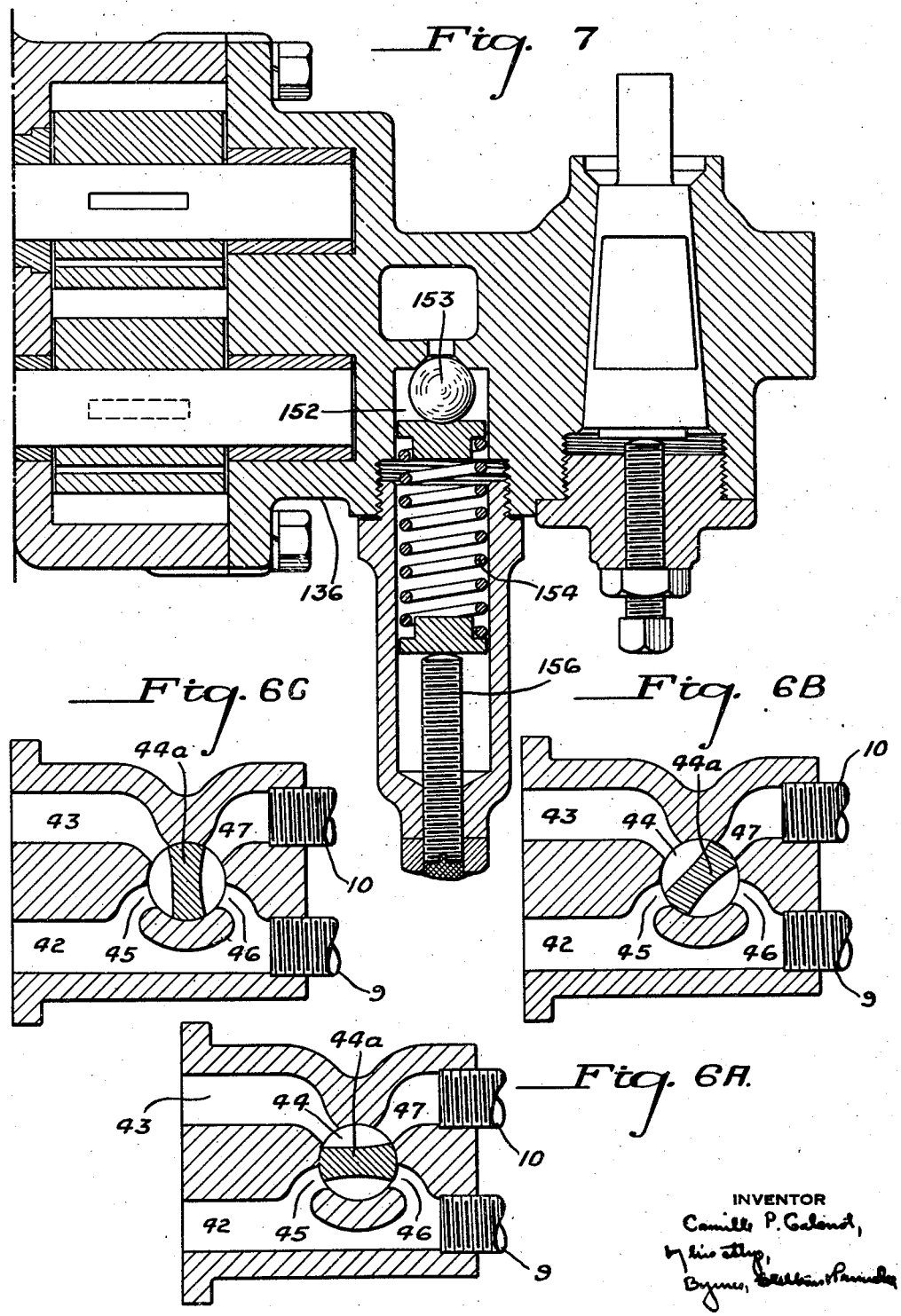

Patented Aug. 23, 1932

1,872,924

UNITED STATES PATENT OFFICE

CAMILLE P. GALANOT, OF YOUNGSTOWN, OHIO, ASSIGNOR, BY MESNE ASSIGNMENTS, TO THE COMMERCIAL SHEARING AND STAMPING COMPANY, OF YOUNGSTOWN, OHIO, A CORPORATION OF OHIO

POWER TAKE-OFF MECHANISM

Application filed October 29, 1927. Serial No. 229,564.

This invention relates to a power take-off mechanism and is particularly described herein as applied to a hydraulic hoist mechanism for a dump truck, although certain features of the invention have numerous other applications.

In Patent No. 1,394,245 to George W. Berry, there is shown an hydraulic hoist for dump trucks comprising a fluid reservoir leading to a pump driven from the transmission of the truck, the pump supplying fluid under pressure to an hydraulic cylinder which is effective for raising the dump body. The Berry apparatus also embodies a control valve for regulating the supply of liquid to the cylinder and a pressure relief valve for the pump.

An apparatus of this character must be fitted to standard trucks of various makes. In some cases it must be fitted on the right hand side of the transmission and in other cases on the left hand side. I provide a power take-off comprising a support adapted to be fitted to the transmission casing of a truck, and a second support adapted to be connected to either end of the first support. The first support preferably carries a shaft and clutch mechanism whereby the shaft may be operatively connected to a power shaft in the transmission. The second support preferably carries a pump shaft and the pump proper. The shafts in the two supports are preferably made with inter-fitting ends so as to make a driving connection. The first support is preferably arranged to return lubricant. It is formed as an extension of the truck transmission casing and receives grease therefrom. The pump shaft is arranged to project onto the first support and make connection thereon with the first shaft. A packing is provided for the pump shaft so as to return the lubricant. This provides a very compact and satisfactory structure. A bearing in the first support preferably serves for the adjacent ends of both the shafts, the bearing structure being so arranged as to engage and position the second support relative to the first. This positively aligns the two shafts.

The second support forms a pump casing. A gear pump is preferred because of its positive action. Regardless of whether a gear or other type of pump impeller is used, I prefer to so mount it on the pump shaft as to permit of longitudinal movement in the casing and to provide a by-pass extending from one side of the casing to the other. An impeller generally extends the entire width of the pump casing, except for mechanical clearance, and the by-pass is effective for maintaining a nice balance of pressure across the width of the pump, thus preventing wear between the casing and the impeller. This arrangement permits of supplying fluid to and taking it from the pump at a side thereof, thus effecting material economy of space, simplifying the design and rendering complicated cores in the casing unnecessary.

A pressure relief valve is provided in the casing adjacent the pump. This arrangement is superior to one where the valve is remote from the pump, in that the power requirements are less and there are no joints in the connections to leak. This last is of particular advantage since an apparatus of this character is subject to considerable vibration and jarring from the truck on which it is mounted.

The pump inlet and outlet are preferably on the side of the pump opposite the pressure relief valve as this simplifies the design and assists in reducing wear between the pump impeller and the casing.

The pump inlet and outlet lead to a valve formed in the casing and effective for controlling the flow of fluid. The inlet leads from a reservoir and is arranged to be in constant communication with the pump. The outlet leads through the valve to the hydraulic cylinder of the dump truck. The valve is effective for directing fluid from the pump to the cylinder; or for closing off the connection to the cylinder so as to confine fluid therein; or for establishing a communication between the cylinder and the reservoir so as to permit the cylinder to empty. In the two latter positions the valve is also effective for short-circuiting the fluid delivered by the pump. This materially improves the flexibility of the apparatus, giving better control of the cylinder.

In the accompanying drawings, which illustrate the present preferred embodiment of my invention, and one modification thereof, Fig. 1 is a top plan view of a portion of a truck skeleton having my improved apparatus applied thereto;

Fig. 2 is a top plan view to enlarged scale, partly broken away, of the power take-off unit;

Fig. 3 is a vertical section to still further enlarged scale, taken on the line III—III of Fig. 2;

Fig. 4 is a vertical transverse section, taken on the line IV—IV of Fig. 3;

Fig. 5 is a vertical transverse section, taken on the line V—V of Fig. 3;

Figs. 6A, 6B, and 6C are views taken on the line VI—VI of Fig. 3, showing different positions of the control valve; and Fig. 7 is a vertical longitudinal section through a modified apparatus.

Figure 1 shows a truck 2 having a transmission in a casing 3. The usual driving connection with the rear wheels is indicated at 4.

The power take-off comprises a support or casing 5 connected to the transmission casing at one side and a second casing or support 6 secured to the casing 5 and to a bracket 7 on the truck frame. The casing 6 contains a pump which is supplied with fluid from a reservoir 8 through a conduit 9. A discharge conduit 10 leads from the pump to a pair of hydraulic cylinders 11 for operating the dump body (not shown) of the truck.

The support 5 is made hollow to receive lubricant and is provided with a flange 12 for connection with the transmission casing. The support carries a fixed shaft 13 on which is mounted a roller bearing 14 carrying a gear 15. The gear 15 is slidable along the roller bearing, its position being controlled by a yoke 16 on a shifter bar 17. The shifter bar is slidable in the support 5 and is provided with a flattened and drilled end 18 for connection with a shifting lever (not shown). A detent 19 is provided for holding the shifter rod in the desired position.

When the gear 15 is in the position shown in the drawings, the power take-off is entirely disconnected from the engine of the truck, but by shifting the gear along the shaft 13 it may be brought into mesh with a gear 20 in the transmission. The gear 20 forms a part of the regular truck transmission and is driven by the truck engine.

The gear 15 is in constant mesh with a gear 21, this latter gear being made wider than the gear 15 so that the shifting of the gear 15 may be effected without disconnecting the gear. The gear 21 is mounted on a shaft 22 running in the ball bearings 23 and 24. That portion of the shaft which lies between the bearings is of large diameter so as to provide shoulders which engage the inner races of the ball bearings and transmit end thrust thereto.

The bearing 23 is held in place by a cap 25 forming the outer shell of a packing gland 26 for the projecting portion 22a of the shaft 22. The bearing 24 is carried in a ring 27. This ring has a flange 28 and a projecting portion 29 adapted to engage and position the support 6.

The support 6 is connected to the support 5 by cap screws 30 and the cap 25 is held in place by similar screws, similarly located. The support 5 is thus made symmetrical, so that the cap 25 and the support 6 may be placed on either end of the support 5 as desired. This permits of placing the apparatus on either the right or left hand side of a transmission, as may be required by the design of a particular truck.

When it is desired to reverse the arrangement of parts it is only necessary to disconnect the supports 6 and 5 and remove the cap 25. The bearings 23 and 24 may then be removed and the shaft 22 withdrawn. The gear 21 is made slidable on the shaft to permit of readily withdrawing the shaft, sleeve 31 being employed for longitudinally positioning the gear on the shaft. When the shaft is withdrawn it may be reversed end for end and replaced.

The support 6 carries a pump shaft 32 having a tongue 33 formed in one end thereof. This tongue fits in a corresponding slot formed in the shaft 22. The ring 27 ensures proper alignment of the shafts. A packing gland 34 is formed in the ring 27 for retaining lubricant in the casing 5.

It will be noted that the bearing 24 accommodates both the shafts 22 and 32. The opposite end of the shaft 32 is carried by a roller bearing 35 in a cover casting 36 forming a part of the casing or support 6.

The pump shaft 32 carries a gear 37, this gear meshing with a gear 38. These gears lie in a recess in the support 6 and form a fluid pump. The gear 38 is mounted on a roller bearing 39 carried by a pin 40. A packing gland 41 is provided for the pump shaft 32.

In operation the pressure developed in the gear pump casing is so high that excessive unit bearing pressures are developed. The roller bearings 35 and 39 are particularly valuable under these circumstances because they ensure circulation of the oil and proper lubrication of the bearings. If, instead of employing roller bearings 35 and 39, ordinary bushings were employed, the bearing pressure would be so high as to prevent the lubricant from reaching the area of maximum pressure, and as a result the bushings would rapidly wear out. The roller bearings are effective for positively circulating lubricant all the way around the bearings.

Oil is entrained between adjacent rollers of the bearings and is carried around as the shaft rotates.

The pump gears fit closely in their casing to prevent pump slippage. In order to minimize wear between the side face of a gear and the housing, openings 41' are provided in the gear. These openings form a by-pass from one side of the pump to the other and prevent the building up of excess pressure on either side of the pump. The gears are free to move longitudinally on their shafts.

The cover casting 36 has an opening 42 extending from the conduit 9 to the pump. This forms the pump inlet. A parallel passage 43 forms the outlet conduit. It will be noted that these passages lead out from the side of the pump chamber. The by-pass openings 41' are particularly important with such an arrangement.

The passage 43 terminates in the chamber of a plug valve 44 formed in the cover casting 36, while the passage 42 is connected to the valve through ports 45 and 46. The conduit 10 terminates in a valve port 47.

The valve plug 44a is provided with an operating handle 48 and a detent 49 (Figure 2) for holding it in the desired position.

The valve plug 44a makes a ground fit adjacent its lower end with the valve casing. Immediately adjacent this ground portion there is provided an annular groove 44b connected to a longitudinal groove 44c which terminates in one of the recessed portions of the valve plug. If any oil passes between the plug and the casing it is collected in the groove 44b and returns through the groove 44c which is positioned so as to be on the low pressure side of the valve.

The space below the large end of the valve plug, as viewed in Figure 5, is connected to the conduit 42 which is on the low pressure side of the pump by a passage 44d. This provides a substantial balance for the pressure tending to force the plug out of its seat.

Figure 6A shows the valve plug in position to raise the piston of the hydraulic cylinder and dump the contents of the truck. Fluid is taken into the pump through the conduit 9 and the passage 42 and is discharged through the passage 43, the valve 44, the port 47, and the conduit 10 to the cylinder 11.

A pressure relief valve is provided so as to prevent breakage in case the pump is operated after the cylinder pistons have completed their travel. This valve comprises passages 50 and 51 leading, respectively, from the high and low pressure sides of the pump and terminating in a cross passage 52. The cross passage contains a ball valve 53 backed by a spring 54. The end of the cross passage is closed by a cap 55 carrying an adjusting screw 56 for the spring 54. The pressure relief valve is placed on the side of the pump opposite the inlet and outlet passages as this tends to eliminate destructive side pressure.

Figure 6B shows the valve plug turned to close off the port 47 and thus isolate the cylinder 11. In this position of the valve, the cylinder pistons are held at the position determined by the amount of fluid in the cylinder when the valve is closed. A notch 49a is formed in the valve plug to cooperate with the detent 49 and specially hold the plug in this position. With the valve plug positioned as in Figure 6B, fluid discharged from the pump is by-passed from the passage 43 through the valve to port 45 and thence to the passage 42. It is thus short-circuited around the pump, relieving the engine of the load which would otherwise be put on it due to the relief valve.

Figure 6C shows the valve plug in position to release fluid from the cylinder 11. In this position the conduit 10 communicates through the port 47, the valve 44 and the port 46, with the conduit 9, so that liquid is free to flow back to the reservoir 8. During this time the fluid discharged from the pump is short-circuited as in Figure 6B.

Figure 7 shows a modified form of apparatus wherein parts corresponding to similar parts in Figures 1 to 6 have been given the same reference character with 100 added thereto. In this form of apparatus the ball relief valve 153 is carried by the cover casting 136. It controls the flow of fluid through a cross passage 152 leading from a passage (not shown) corresponding to the passage 43 to a passage (not shown) corresponding to the passage 42.

I have illustrated a preferred embodiment of my invention and one modification thereof, but it will be understood that it is not limited to the forms shown, as it may be otherwise embodied within the scope of the following claims:

I claim:

1. A power take-off adapted to make an operative connection with an automotive vehicle, comprising a support having a shaft journaled therein and arranged to be driven from a power shaft of the vehicle, said shaft being removable from the support and replaceable therein when reversed end for end, a second support adapted to be positioned at either end of the first mentioned support, means at both ends of the first support for receiving the second support and securing it thereto, and a shaft carried by the second support and arranged to be driven from the first mentioned shaft.

2. A power take-off adapted to make an operative connection with an automotive vehicle, comprising a support having a shaft journaled thereon and arranged to be driven from a power shaft of the vehicle, the shaft being removable from the support and replaceable therein when reversed end for end, a second support adapted to be positioned at either end of the first mentioned support, means at both ends of the first support for receiving the second support and securing it thereto, and a shaft carried by the second support, the shafts having inter-fitting end portions.

3. A power take-off for a motor vehicle having power-transmission mechanism, including an auxiliary housing, a shaft reversibly journaled therein, a second auxiliary housing adapted to be secured to either end of the first-mentioned housing, means at both ends of the first support for receiving the second support and securing it thereto, a shaft journaled in the second housing and detachably connected to said first-mentioned shaft for driving an auxiliary power-transmission system.

In testimony whereof I have hereunto set my hand.

CAMILLE P. GALANOT.